United States Patent [19]

Miura et al.

[11] Patent Number: 5,194,525
[45] Date of Patent: Mar. 16, 1993

[54] CONTINUOUS MASS POLYMERIZATION PROCESS FOR MAKING STYRENE COPOLYMERS

[75] Inventors: Yoshikiyo Miura; Kyotaro Shimazu, both of Chiba, Japan

[73] Assignee: Dainippon Ink and Chemicals, Inc., Tokyo, Japan

[21] Appl. No.: 740,900

[22] Filed: Aug. 6, 1991

Related U.S. Application Data

[63] Continuation-in-part of Ser. No. 448,627, Dec. 11, 1989, abandoned.

[30] Foreign Application Priority Data

Dec. 12, 1988 [JP] Japan ............... 63-312112

[51] Int. Cl.$^5$ ............... C08F 2/02; C08F 220/06
[52] U.S. Cl. ............... 526/64; 526/65; 526/67; 526/68; 526/82; 526/84; 526/87; 526/88; 526/318.45; 526/318.6
[58] Field of Search ............... 526/64, 65, 84, 318.45, 526/87, 88, 318.6, 67, 68, 82

[56] References Cited

U.S. PATENT DOCUMENTS

| | | | |
|---|---|---|---|
| 3,035,033 | 5/1962 | Schweitzer et al. | 526/87 |
| 3,639,372 | 2/1972 | Haynes, Jr. et al. | 526/65 |
| 3,859,268 | 1/1975 | Novack et al. | 526/65 |
| 4,110,521 | 8/1978 | Barnett et al. | 526/64 |
| 4,209,599 | 6/1980 | Brady et al. | 526/64 |
| 4,948,847 | 8/1990 | Morita et al. | 526/64 |

FOREIGN PATENT DOCUMENTS

307238 3/1989 European Pat. Off. .
640836 7/1950 United Kingdom .

OTHER PUBLICATIONS

Polymer Processes, C. E. Schildknecht (ed.), Interscience, N.Y., 33, 37 (1956).

*Primary Examiner*—Fred Teskin
*Attorney, Agent, or Firm*—Sherman and Shalloway

[57] ABSTRACT

A process for producing a styrenic copolymer for injection molding or extrusion molding by continuous mass polymerization of a styrenic monomer with a polymerizable unsaturated fatty acid, charcterized by using a polymerization apparatus comprising a circulation polymerization line (I) in which a tubular reactor with plural mixing elements fixed therein is incorporated, said mixing elements having no mobile parts, and a second non-circulation polymerization line (II) provided in succession to said circulation polymerization line (I), in which a tubular reactor with plural mixing elements fixed therein is incorporated, said mixing elements having no mobile parts; and supplementing the polymerizable unsaturated fatty acid to at least two spots of the second non-circulation polymerization line (II).

11 Claims, 1 Drawing Sheet

CONTINUOUS MASS POLYMERIZATION PROCESS FOR MAKING STYRENE COPOLYMERS

This application is a continuation-in-part application of Ser. No. 07/448,627 filed on Dec. 11, 1989, now abandoned.

This invention relates to a process for producing copolymers of copolymerizable unsaturated fatty acids and styrenic monomers which excel in transparency, heat resistance and moldability and are useful as injection-molding and or extrusion molding materials.

Polystyrene resins and acrylic resins have been known as transparent resins having excellent moldability. They, however, have the defect of being inferior in heat resistance, particularly in heat distortion temperature.

On the other hand, polycarbonate resins are known as thermoplastic resins having both heat resistance and transparency. However, these resins have not come into widespread acceptance because of their poor moldability and high price.

For these reasons, as resins having improved heat resistance while retaining the excellent moldability and transparency of polystyrene resin, copolymer resins formed by copolymerization of styrene with acrylic or methacrylic acid have been proposed.

Suspension methods and continuous polymerization methods are generally used for production of such copolymer resins. A suspension polymerization method is disclosed, for example, in Japanese Laid-Open Patent Publication No. 85184/1974. A continuous polymerization method is disclosed, for example, in U.S. Pat. No. 3,085,033.

The suspension polymerization method can give the product of excellent heat resistance and processability. However, since it uses a dispersing agent, the resin is liable to undergo coloration. Furthermore, since it is carried out batchwise, its productivity is low. For those reasons, continuous polymerization is regarded to be more desirable.

In preparing copolymers by continuous polymerization, generally for the preparation of copolymers composed of at least two monomeric components it is desirable that the monomeric structure in the formed copolymer be uniform throughout individual polymer molecules. Taking a case of a styrene-methacrylic acid copolymer, for example, if the weight ratio of styrene to methacrylic acid in the copolymer as a whole is 90:10, the copolymer may be a mixture of styrene homopolymer and a styrene-methacrylic acid copolymer containing more than 10 wt % of methacrylic acid; or it may be an ideal styrene-methacrylic acid copolymer all the polymer molecules of which contain 10 wt % of methacrylic acid.

If such two copolymers are compared as to their physical properties, the former is a mixture of two different types of polymers substantially differing in polarity, and because the two component polymers cannot be intimately blended, shaped articles formed therefrom are inferior in transparency and have markedly reduced commercial value due to appearance of flow marks. On the other hand, the latter can be regarded as a copolymer in true sense, which gives highly transparent products.

For this reason it is desirable that the composition of polymer molecules in a copolymer be as uniform as possible.

Whereas it is by no means easy to form copolymers of uniform composition. Again taking copolymerization of styrene with methacrylic acid for example, the two monomers have different reaction rates. In radical copolymerization, consumption rate of methacrylic acid is about twice that of styrene, and hence if they are simply mixed and polymerized polymer molecules of differing compositions would form as in the former case and only shaped articles of inferior transparency can be obtained.

As a means to solve this problem, attempts have been made to use a looped tubular reactor(s) as taught in U.S. Pat. No. 3,035,033 and by compulsory circulation of a reaction liquid therethrough to mix starting materials supplied with the reaction liquid to uniformize the monomeric composition in the formed copolymer.

This method however is subject to other problems.

One of the problems lies in the mixing. In order to satisfactorily well mix fed starting materials with the reaction liquid, a sufficient amount of circulating liquid to the fed materials must always be secured. However, when such a high-speed circulation is conducted, the pressure inside the reactor rises with increase in viscosity of the reaction liquid, and capacity of the circulation pumps must also be increased. These factors inavoidably incur certain limitations, and an invention of a more efficient mixing method has been in demand.

Another problem is that of productivity. With the use of such a looped circulation reactor alone it is difficult to raise viscosity of the circulating system inside the reactor because of the aforesaid problem of viscosity versus mixing ability. In other words, it is difficult to raise polymer content of the reaction liquid, which results in low productivity. Again the load on the volatilizing section subsequent to the reaction section is increased. Thus according to said U.S. Pat. No. 3,035,033, currently obtainable polymer content is around 50–60% by weight.

Still another problem is the quantity of substandard products formed at the time of changeover when copolymers of different compositions are manufactured with same and single reactor.

When copolymers of different compositions are manufactured with a same reactor, for example, during a changeover from a copolymer containing 5 wt % of methacrylic acid to one containing 10 wt % of said acid, copolymers of which methacrylic acid contents vary in the range from 5 wt % to 10 wt % are continuously produced. To make matters worse, styrene-methacrylic copolymers of different methacrylic acid contents are immiscible with each other, and their mixtures become non-transparent. For example, if a copolymer containing 10 wt % of methacrylic acid is mixed with about 10 wt % thereof of another copolymer containing 7.5 wt % of methacrylic acid, the former's transparency is heavily impaired. Such a problem however is nil with polystyrene.

Thus it is desirable that the quantity of the sub-standard product formed at the time of changeover in copolymer compositions should be the possible minimum. Whereas, in Example 1 of U.S. Pat. No. 4,195,169 using the reactor disclosed in aforesaid U.S. Pat. No. 3,035,033, at least three times the residence time was required before the molecular weight drop caused by addition of an alcohol was stabilized.

Under the state of art as above, we had made extensive studies to solve those problems, to discover that the mixing can be effectively conducted, drop in productivity can be prevented and furthermore the amount of substandard products formed at times of changeover can be reduced, by the use of a circulating polymerization line in which at least one tubular reactor with plural mixing elements fixed therein is incorporated, said mixing elements having no mobile parts, and a second polymerization line provided in succession to said circulation polymerization line, which is composed of at least one tubular reactor with plural mixing elements fixed therein, said mixing elements having no mobile parts, and by supplementing the feed of polymerizable unsaturated fatty acid to at least two spots in the second polymerization line, and came to complete the present invention.

Namely the present invention provides a continuous mass polymerization method of styrenic copolymers which comprises making styrenic copolymers by continuously mass polymerizing styrenic monomers with polymerizable unsaturated fatty acids, characterized by use of a polymerization apparatus comprising a circulation polymerization line (I) in which at least a tubular reactor with plural mixing elements fixed therein is incorporated, said mixing elements having no mobile parts, and a second polymerization line (II) provided in succession to said circulation polymerization line (I), in which at least a tubular reactor with plural mixing elements fixed therein is incorporated, said mixing elements having no mobile parts, and by supplementing the feed of polymerizable unsaturated fatty acid to at least two spots in the second polymerization line (II). The circulation polymerization line (I) is a circulation-type polymerization line in which the liquid solution is divided into two parts in two directions at the outlet of the tubular reactor and one part thereof is returned to the inlet of the tubular reactor and refluxed to conduct the polymerization.

Styrenic monomers useful for the present invention include styrene and its derivatives such as alpha-methylstyrene, o-chlorostyrene, p-chlorostyrene, p-methylstyrene, 2,4-dimethylstyrene, t-butylstyrene and the like, styrene being the most preferred.

Typical polymerizable unsaturated fatty acids useful for the present invention include acrylic, methacrylic, itaconic, maleic, fumaric and cinnamic acids, acrylic acid and/or methacrylic acid being the most preferred.

Those unsaturated fatty acids show an effect of improving heat resistance. They are used within a range of more than 4 but not more than 35 based on the total weight of the monomers for excellent heat resistance and moldability.

According to the present invention, besides styrenic monomers and polymerizable fatty acids, other monomers copolymerizable therewith may be added. Typical examples of such other monomers include maleic anhydride, acrylonitrile, acrylic acid alkyl esters, methacrylic acid alkyl esters and maleimides.

It is also possible to use suitable organic solvents for practicing the present invention. Typically such organic solvents as aromatic hydrocarbons, e.g., toluene, ethylbenzene and xylene, ketone organic solvents e.g., methyl ethyl ketone and methyl isobutyl ketone; ether organic solvents e.g., dimethylcellosolve and monomethylcelloselve; can be used.

Suitable organic peroxides may also be used for practicing the present invention. Typically such peroxides as peroxyketals e.g., 1,1-di-t-butylperoxycyclohexane, 1,1-di-t-butylperoxy-3,3,5-trimethylcyclohexane, 2,2-di-t-butylperoxyoctane, n-butyl-4,4-di-t-butylperoxyvalerate and 2,2-di-t-butylperoxybutane; and peroxy esters e.g., t-butylperoxyacetate, t-butylperoxy-3,5,5-trimethylhexanoate, t-butylperoxylaurate, t-butylperoxybenzoate, di-t-butyldiperoxyisophthalate, 2,5-dimethyl-2,5-dibenzoylperoxyhexane, t-butylperoxymaleic acid and t-butylperoxyisopropyl carbonate; may be used. These can be used either singly or in combination.

Furthermore according to the present invention, the rate of polymerization or molecular weight of the product can be regulated by using alpha-methylstyrene dimer or mercaptanes such as t-dodecylmercaptane, n-dodecylmercaptane as molecular weight-regulating agents.

The tubular reactors used in the present invention are the ones in which plural mixing elements are fixed therein, said elements having no mobile parts. As the plural mixing elements, those which mix polymerization liquid by repeating division of polymerization liquid flow fed into the tube, changing the direction of flow and/or direction of the division, and combining the divided flows, can be used. As such tubular reactors, for example, Sulzer-type tubular mixers, Kenics-type static mixers and Toray-type tubular mixers are preferred.

Number of tubular reactors to be used in the present invention differs depending on such conditions as, when Sulzer-type tubular mixers or Kenics-type static mixers are employed, length of the employed mixer, number of mixing elements, and the like. It is satisfactory that at least one of such reactors is incorporated in each of the circulation polymerization line (I) and a second polymerization line (II), and the number is subject to no critical limitation. Normally, however, 4 to 15, preferably 6 to 10, mixers each having at least 5, preferably 10 to 40, mixing elements are used in combination. Normally 1 to 10, preferably 2 to 6, of such mixers each are incorporated in the circulation polymerization line (I) and second polymerization line (II).

In order to make copolymers of polymerizable unsaturated fatty acids and styrenic monomers by the continuous mass polymerization method of the present invention, at least one of polymerizable unsaturated fatty acid and at least one styrenic monomer are continuously fed to the circulation polymerization line (I) either as a blend or separately, and are polymerized in said line (I) while being throughly mixed therein. It is also permissible to incorporate a reactor in front of the entrance into the line (I) to effect partial polymerization in said reactor and thereafter feed the partially polymerized system to the circulation polymerization line (I).

The starting materials fed into the line (I) are continuously combined and mixed with the polymerization liquid which is being circulated through the line (I) while being polymerized and mixed (This liquid will be hereinafter referred to as "the initial polymerization liquid"), and undergo initial polymerization and mixing in the tubular reactor while being circulated, normally at reaction temperatures of 110° to 140° C.

A part or the greatest part of the polymerization liquid circulating through the line (I) continuously flows into the second polymerization line (II), and the remaining initial polymerization liquid continues to circulate through the line (I).

The ratio R (reflux ratio) of the flow rate (reflux rate) $F_1$ (liter/hour) of the remaining initial polymerization liquid which continues to circulate through the line (I), not flowing into the second polymerization line (II), to the flow rate $F_2$ (liter/hour) of the initial polymerization liquid flowing into the second polymerization line (II) is normally within a range of $R=F_1/F_2=1$ to 40, preferably 5 to 20.

It is preferred that in this circulation polymerization line (I) the initial polymerization liquid should be polymerized while being thoroughly mixed. For this purpose, the polymer content of the polymerization liquid within the line (I) is normally kept within a range of 10 to 60% by weight, more preferably 25 to 45% by weight, for an adequate viscosity and favorable balance between the mixing efficiency and productivity.

The initial polymerization liquid which flows into the second polymerization line (II) is polymerized normally under escalating reaction temperature until the polymer content reaches 60 to 90% by weight normally at 110° to 160° C., then removed of unreacted monomers and solvent in, for example, a volatilization vessel under reduced pressure, and thereafter pelletized. The second polymerization line (II) is provided for raising the polymer content of the polymerization liquid which could not be sufficiently raised in the circulation polymerization line (I) for the necessity of thorough mixing of initial polymerization liquid. In this second line the polymer content becomes high and the viscosity rises, but the pressure within the system can be kept down within practical limit (normally 5 to 50 kg/cm$^2$) by reducing the flow rate in the reactor(s) from that in the line (I).

In that occasion, concentration of the polymerizable unsaturated fatty acid to be supplemented may be 100% by weight but when it is diluted before the addition to the line (II) with an organic solvent as above-named and/or a styrenic monomer, preferably styrene, to 75 to 5% by weight, preferably 60 to 7% by weight, a copolymer excelling in transparency and producing no flow mark in the course of molding can be obtained, and therefore, such dilution is preferred. In a particularly preferred practice, furthermore, a polymerization inhibitor is added to the polymerizable unsaturated fatty acid within a range of 30 to 400 ppm, resulting in provision of a copolymer excelling in transparency and free form flow mark formation during molding, without any reduction in polymerization rate or coloring.

As the polymerization inhibitors useful for this purpose, for example aromatic compounds containing benzene rings substituted with at least one hydroxyl group can be named. Typical examples include tertiary butyl catechol, hydroquinone, p-methoxyphenol, p-ethoxyphenol, 2,4-dimethyl-6-tertiary butylphenol, etc.

The feed amount of polymerizable unsaturated fatty acid to be additionally supplied is so determined as to make the polymerizable unsaturated fatty acid content of the copolymer formed in each of the tubular reactors as uniform as possible, generally to make the content within a range of ±30% by weight, preferably ±15% by weight, to the intended final polymerizable unsaturated fatty acid content. This feed amount of polymerizable unsaturated fatty acid is normally calculated for individual case based on the value of relative reactivity ratio known from copolymerization theory, or experimentally determined.

So determined feed amount of the polymerizable unsaturated fatty acid is normally within a range of 0.05 to 10 parts, preferably 0.1 to 7.5 parts, inter alia, 0.2 to 5 parts, per single feed spot, per 100 parts by weight of the polymerization liquid flowing through the tubular reactor, the parts being by weight.

Again, the number of spots at which the polymerizable unsaturated fatty acid is supplemented should be at least two, normally 2 to 10, preferably 3 to 8.

Copolymer resins prepared in accordance with the present invention are processable as they are, by injection molding, extrusion molding or the like, but if necessary known and customarily used various additives such as ultraviolet absorbing agents, antioxidants, heat-stabilizers, plasticizing agents or lubricants or the like can be added within a range as will not adversely affect the copolymer performance.

Thus obtained styrenic copolymers of the present invention can be subjected to molding procedures of thermoplastic resins, whereby providing various shaped articles, e.g., extrusion-molded articles such as film, sheet or board; biaxially stretched extrusion-molded articles such as biaxially stretched sheet or biaxially stretched film; foamed extrusion-molded articles such as foamed sheet and foamed board; and blow-molded articles or injection-molded articles.

Hereinafter the present invention will be more specifically explained with reference to working examples and control examples, in which parts and percentages are by weight, unless otherwise specified.

EXAMPLES 1-9 AND CONTROL EXAMPLES 1-2

Figure 1:
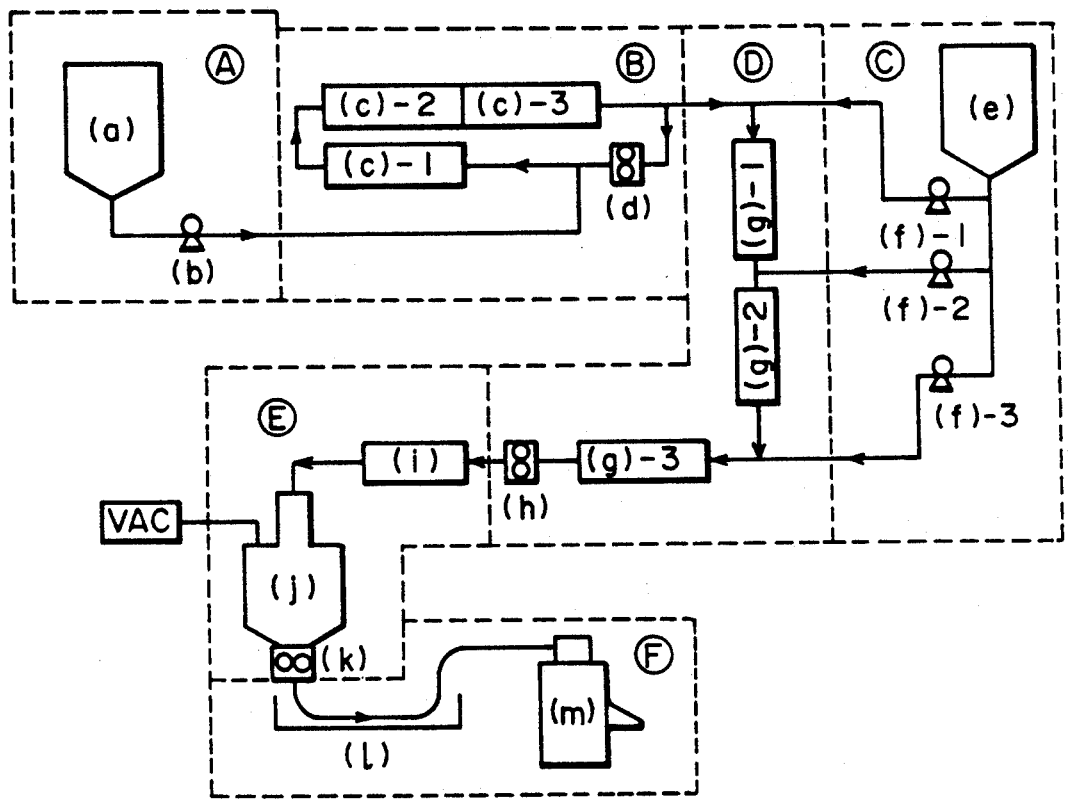
FIG. 1 is a flow sheet indicating the process for making styrene copolymers of the present invention.

The polymerization vessel employed in Examples 1-9 is composed of sections (A)-(F), as illustrated in FIG. 1. Each of those sections will be explained hereinbelow.

Section (A): Section (A) is a main starting material-supplying section, which is composed of a tank (a) of 100 liters in capacity and a feed pump (b) for supplying the starting material in the tank to a reaction section.

Section (B): Section (B) is a circulation polymerization line (I) for initial polymerization and is composed of three tubular reactors [(c)-1 to (c)-3] manufactured by Sulzer Co, each of which accommodates therein mixing elements, is 7.2-liters in capacity and equipped with a jacket, and a gear-pump (d) for circulating the initial polymerization liquid. Temperature in each of the tubular reactors is controlled with a heating medium.

The main starting material fed into this section (B) from the main material supply section (A) is fed from the discharging side of the gear pump (d), and is polymerized while passing through the three tubular reactors. Also an equal weight to that of the main material fed into this section (B) of an initial polymerization liquid is pushed out into the second polymerization line (II), the remaining initial polymerization liquid being returned to the suction side of the gear pump (d), combined with the main material fed continuously and further circulated.

Section (C): Section (C) is a second starting material-supplying section into the second polymerization line (II). This section is composed of a material tank (e) of 30-liters in capacity and three quantitative pumps [(f)-1 to (f)-3] for supplying the starting material to the line (II).

Section (D): Section (D) is the second polymerization line (II), which is composed of three jacketted tubular reactors [(g)-1 to (g)-3] made by Sulzer having a capacity of 7.2 liters and containing mixing elements accommodated therein, and a gear pump (h) for transferring the polymerization liquid to a volatilization section (E). In front of each of the tubular reactors a feedline is connected for supplying the starting material from the second material-supplying Section (C). Temperature in the tubular reactors is each independently controlled with a heating medium.

Section (E): Section (E) is a section for separating the polymer in the polymerization liquid supplied from the second polymerization line (II) from unreacted monomers and solvent, which is composed of a heat exchanger (i) for raising the temperature of the polymerization liquid to 200° C. or above, a volatilization tank (j) for separating the polymer from volatile portion under reduced pressure, and a gear pump (k) for extracting the separated polymer from the volatilization tank. The polymer is fed from the gear pump (k) to a pelletizing Section (F), and the volatile component is condensed in a condenser.

Section (F): Section (F) is provided for pelletizing. The polymer extracted from the volatilization tank in form of a strand is cooled in a water tank (l) and pelletized with a cutter (m).

Using a polymerization apparatus as above, continuous mass polymerization was conducted with the compositions of the starting material and under conditions indicated in Table 1, to provide pellets of styrene copolymers. Using so obtained pellets and polystyrene resin pellets [DIC STYRENE CR-3500, a commercial product of Dainippon Ink Chemical Industries, Co.], thermal deformation temperature, occurrence of flow marks, and opacity in test pieces were examined in the following manner.

1 Thermal deformation temperature: ASTM D-648 (264 psi) is followed.

2 Occurrence of flow marks: A 200×120×20 mm radio cabinet was shaped with a 4-oz injection molding machine [a screw-type (V20-140 Model)] manufactured by Nihon Seikojo K.K.] and occurrence of flow marks on which was graded with visual observation.

Figure 2:
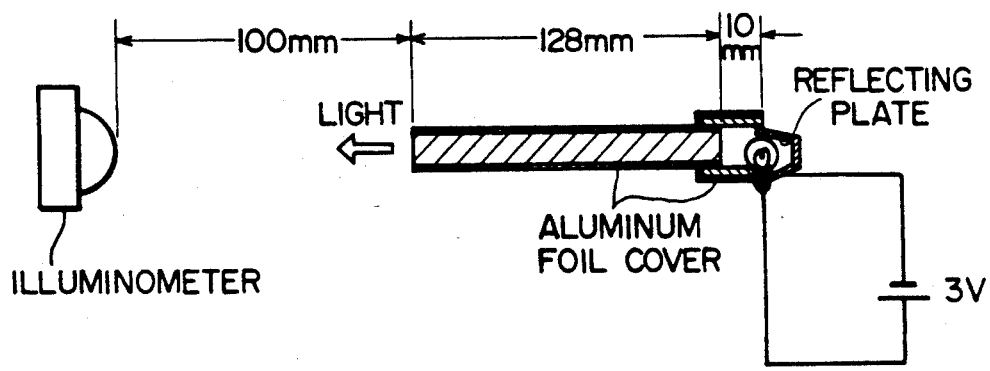
FIG. 2 illustrates a device for testing the haze of shaped products of styrenic copolymers obtained through the method of the present invention.

3 Haze of shaped articles: As for haze of shaped articles, in order to evaluate light transmittability under conditions actually used on lamps, etc., a device as indicated in FIG. 2 was used. Light emitted from a miniature lamp was transmitted longitudinally through a test piece (128×12.8×6.4 mm) covered with an aluminum foil, and the illuminance at a fixed distance from the forward end of the test piece was measured.

TABLE 1

| | | | Unit | Example 1 | 2 | 3 | 4 | 5 | 6 | 7 | 8 |
|---|---|---|---|---|---|---|---|---|---|---|---|
| Material supplied from Section A | | | | | | | | | | | |
| | Amount | fed composition | kg/Hr | 8.00 | 8.00 | 8.00 | 8.00 | 8.00 | 8.00 | 8.00 | 8.00 |
| | | styrene | % | 94.0 | 88.7 | 88.7 | 88.7 | 88.7 | 80.8 | 80.8 | 88.7 |
| | | methacrylic acid | " | 3.4 | 6.3 | 6.3 | 6.3 | 6.3 | 9.2 | 9.2 | 6.3 |
| | | ethylbenzene | " | 3.0 | 5.0 | 5.0 | 5.0 | 5.0 | 10.0 | 10.0 | 5.0 |
| Section B | Polymerization temp. | | °C. | 135 | 130 | 130 | 130 | 130 | 130 | 130 | 130 |
| | Polymer content at the exit of Section B | | % | 43.5 | 36.6 | 36.0 | 36.0 | 36.2 | 35.4 | 35.4 | 36.6 |
| Section C | Supply rate | [quantitative pump (f-1)] | kg/Hr | 0.03 | 0.04 | 0.07 | 0.07 | 0.10 | 0.11 | 0.11 | 0.4 |
| | | [quantitative pump (f-2)] | " | 0.06 | 0.06 | 0.13 | 0.13 | 0 | 0.19 | 0.19 | 0.6 |
| | | [quantitative pump (f-3)] | " | 0.06 | 0.06 | 0.12 | 0.12 | 0.06 | 0.17 | 0.17 | 0.6 |
| | Composition | methacrylic acid | % | 50 | 100 | 50 | 50 | 100 | 50 | 50 | 10 |
| | | styrene | " | 0 | 0 | 0 | 0 | 0 | 0 | 0 | 90 |
| | | ethylbenzene | " | 50 | 0 | 50 | 50 | 0 | 50 | 50 | 0 |
| | | p-methoxyphenol | ppm*1 | 0 | 0 | 0 | 200 | 0 | 0 | 200 | 200 |
| Section D | Polymerization temp. | [reactor (g-1)] | °C. | 135 | 135 | 135 | 135 | 135 | 135 | 135 | 135 |
| | | [reactor (g-2)] | " | 140 | 140 | 140 | 140 | 140 | 140 | 140 | 140 |
| | | [reactor (g-3)] | " | 150 | 150 | 150 | 150 | 150 | 145 | 145 | 145 |
| | Polymer content at the exit of Section D | | % | 80.3 | 74.2 | 73.7 | 73.3 | 74.0 | 69.7 | 69.1 | 70.2 |
| | Methacrylic acid content of product | | % | 5.0 | 10.3 | 10.1 | 10.0 | 10.4 | 14.7 | 14.5 | 9.9 |
| | Thermal deformation temp. | | °C. | 98 | 106 | 106 | 106 | 106 | 113 | 113 | 106 |
| | Occurrence of flow marks | | — | none | none | none | none | none | none | none | none |
| | Hazed of shaped article | | lux | 92 | 85 | 90 | 91 | 75 | 88 | 89 | 92 |

| | | | Unit | Example 9 | Comparative Example 1 | Comparative Example 2 |
|---|---|---|---|---|---|---|
| Material supplied from Section A | | | | | | |
| | Amount | fed composition | kg/Hr | 8.00 | 8.00 | |
| | | styrene | % | 80.8 | 88.7 | |
| | | methacrylic acid | " | 9.2 | 6.3 | |
| | | ethylbenzene | " | 10.0 | 5.0 | |
| Section B | Polymerization temp. | | °C. | 130 | 130 | |
| | Polymer content at the exit of Section B | | % | 35.4 | 36.0 | |
| Section C | Supply rate | [quantitative pump (f-1)] | kg/Hr | 0.4 | 0.16 | |
| | | [quantitative pump (f-2)] | " | 0.6 | 0 | |
| | | [quantitative pump (f-3)] | " | 0.6 | 0 | |
| | Composition | methacrylic acid | % | 15 | 100 | |
| | | styrene | " | 85 | 0 | |
| | | ethylbenzene | " | 0 | 0 | |
| | | p-methoxyphenol | ppm*1 | 200 | 0 | |
| Section D | Polymerization temp. | [reactor (g-1)] | °C. | 135 | 135 | |
| | | [reactor (g-2)] | " | 140 | 140 | |
| | | [reactor (g-3)] | " | 145 | 150 | |
| | Polymer content at the exit of Section D | | % | 65.3 | 73.5 | |

DIC-STYRENE CR-3500

TABLE 1-continued

| | | | | |
|---|---|---|---|---|
| Methacrylic acid content of product | % | 14.5 | 10.4 | 0 |
| Thermal deformation temp. | °C. | 113 | 106 | 85 |
| Occurrence of flow marks | — | none | EXIST | none |
| Hazed of shaped article | lux | 90 | no more than 60 | 90 |

*1 ppm: Added amount of p-methoxyphenol to methacrylic acid (by ppm).

The results of Examples 1 to 9 indicate that the products according to the present invention exhibit improved heat resistance to that of conventional polystyrene (Comparative Example 1) and that excellent copolymers free from flow marks and shaped articles free from haze can be obtained therefrom.

Again, in any of those Examples, the polymer content of the polymerization liquid at the exit of polymerization section exceeded 65%, indicating that higher productivity can be obtained compared to that in the conventional art of U.S. Pat. No. 3,035,033, which is 50 to 60%.

When the time required for changeover from Example 1 for making a copolymer containing 5% of methacrylic acid to Example 3 for making a copolymer containing 10% of methacrylic acid was measured, it was as short as 9 hours, which is about twice the residence time, and the amount of sub-standard product formed was little.

The copolymers obtained by the present invention are well suited for injection molding and extrusion molding because, particularly when made into shaped articles they show no occurrence of flow marks and exhibit very high transparency. They show wide utilities, for example, covers of illuminating devices such as fluorescent lamp cover and a lamp shade; components of low-voltage electrical appliances, such as audio cassettes, compact discs, optical discs, parts of coffee makers and closures of driers; automobile parts such as prism lenses, inner lenses, lamps and lamp covers of car meters or car audios, windshields and ceiling materials of tractors; heat-resistant food containers such as noodle cups and steamable containers; food containers which can be heated in an electronic oven, for example, containers for various types of foods including chilled foods and dried foods and lunch boxes; medical instruments such as trays, artificial organs, animal keeping boxes and petri dishes; and components of a copying machine, such as lenses, trays and bins.

What we claim is:

1. A process for producing a styrenic copolymer for injection molding or extrusion molding by continuous mass polymerization comprising the steps of continuously
   (A) polymerizing a styrenic monomer and a polymerizable unsaturated fatty acid by feeding them into a polymerization line (I) comprising a tubular reactor (c) with plural mixing elements, said mixing elements having no mobile parts,
   (B) refluxing a major part of polymerization liquid which flows out of the polymerization line (I) to an inlet of a non-circulation polymerization line (II), provided in succession to polymerization line (I), having a tubular reactor (g) with plural mixing elements fixed therein and at least two feed openings (f) provided before said tubular reactor (g), said mixing elements having no mobile parts, and
   (C) adding to the remainder of the polymerization liquid which is not refluxed about 0.1–7.5 parts by weight of a solution containing polymerizable unsaturated fatty acid based on 100 parts by weight of the polymerization liquid per each one of said at least two feed openings (f), and
   (D) conducting polymerization in the polymerization line (II).

2. The polymerization process of claim 1 wherein the polymerizable unsaturated fatty acid is added in an amount of more than 4% by weight and smaller than 35% by weight based on the total weight of the monomers used.

3. The process of claim 1 wherein the polymerizable unsaturated fatty acid is supplemented from 3 to 8 feed openings of the second non-circulation polymerization line (II).

4. The polymerization process of claim 3 wherein the solution containing a polymerizable unsaturated fatty acid is a mixture of a polymerizable unsaturated fatty acid and an organic solvent, a styrenic monomer or a mixture of an organic solvent and a styrenic monomer.

5. The process of claim 3 wherein a polymerizable unsaturated fatty acid containing a polymerization inhibitor is supplemented.

6. The process of claim 5 wherein the content of the polymerization inhibitor is 30 to 400 ppm based on acrylic acid, a mixture of acrylic acid and methacrylic acid or methacrylic acid and the concentration of acrylic acid alone, methacrylic acid alone or the mixture of methacrylic acid and acrylic acid is 60 to 7% by weight.

7. The process of claim 1 wherein the content of the polymer in the initial polymerization liquid in the circulation polymerization line (I) is 25 to 45% by weight.

8. The process of claim 1 that the content of the polymer in the polymerization liquid at the outlet of the second non-circulation polymerization line (II) is 60 to 90% by weight.

9. The polymerization process of claim 1 wherein the styrenic monomer is styrene, and the polymerizable unsaturated fatty acid is selected from the group consisting of acrylic acid, methacrylic acid and mixtures thereof.

10. The polymerization process of claim 1 wherein the content of polymer in the polymerization liquid recovered from the polymerization line (II) is 60 to 90% by weight.

11. The process of claim 1, 10 or 7 wherein the reflux ratio R is 5 to 20.

* * * * *